United States Patent Office 3,458,836
Patented July 29, 1969

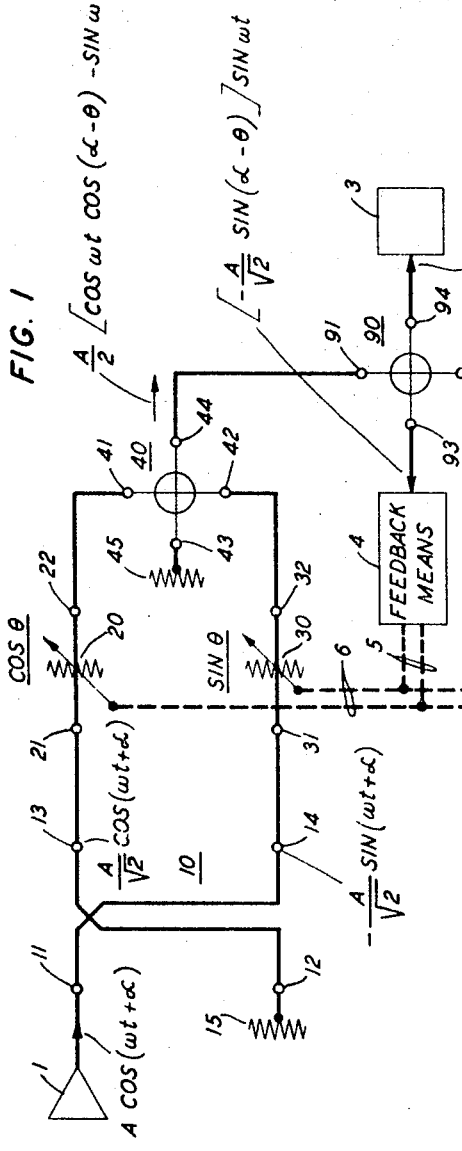
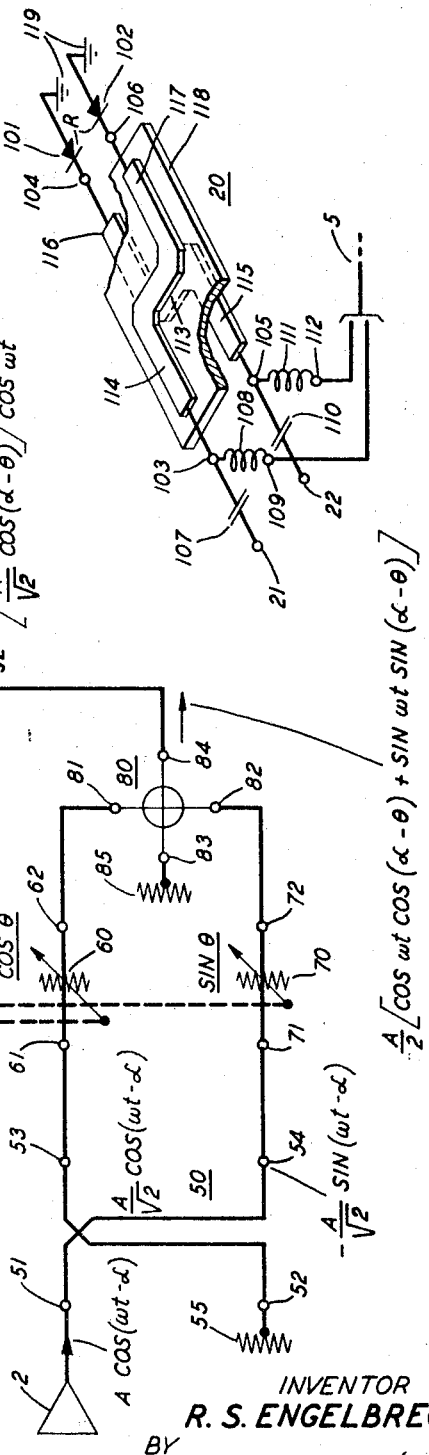

3,458,836
BROADBAND ANGLE RESOLVER FOR PHASED ARRAY RECEIVING SYSTEMS
Rudolf S. Engelbrecht, Bernardsville, N.J., assignor to Bell Telephone Laboratories, Incorporated, Murray Hill and Berkeley Heights, N.J., a corporation of New York
Filed Dec. 15, 1967, Ser. No. 690,846
Int. Cl. H03h 7/50; H01p 1/22, 5/14
U.S. Cl. 333—18                               4 Claims

ABSTRACT OF THE DISCLOSURE

A broadband angle resolver employing two directional couplers, three hybrid junctions and four attenuators. Two alternating signals having equal phase angles but of opposite sign are applied, respectively, to one port of each of the directional couplers. The two directional couplers are coupled to two of the hybrid junctions through the four attenuators and the third hybrid junction is coupled to the first two hybrid junctions. The attenuators introduce voltage transmission coefficients proportional to functions of an arbitrary angle and when this angle is made equal to the phase angles of the alternating signals, the voltage at one output port of the third hybrid junction will reach a maximum while the voltage at another of its ports will reach a null. This null voltage output can be used to automatically adjust the four attenuators to track the phase angles of the alternating signals while the maximum output is the useful output of the resolver.

Government contracts

The invention herein claimed was made in the course of or under a contract with the Department of the Army.

Background of the invention

This invention relates to phased array receiving systems and more particularly to a broadband angle resolver for determining the phase angles of the signals arriving at symmetrically disposed receiving elements in the array.

The angle at which an acoustical or electrical wave arrives at the face of a receiving array is directly related to and determines the phase angles of the signals as they arrive at the several elements of the array so that the arrival angle of the wave may be determined by resolving the phase angles of the signals. In radar applications, in particular, this angle resolution has generally been accomplished by microwave circuit structures which are frequency sensitive so that the angle resolution is subject to serious errors due to frequency variations. Some of these prior structures involve mechanically driven variable capacitors which are inherently frequency sensitive as well as intolerably slow for modern phased array applications. Higher speeds are achieved by electronically switched digital phase shifters but these are usually reactive and hence frequency sensitive. Electronically switchable transmission lines have been proposed as digital phase shifters and, while these may be made essentially independent of frequency, they become impractical in large arrays because of their size and cost and also because the steering orders become quite complex.

In the copending application of R. L. Mattingly and W. W. Mumford, Ser. No. 690,961, filed on even date herewith and assigned to the same assignee, a broadband microwave angle resolver is disclosed and claimed which comprises only one directional coupler to receive both input signals.

Summary of the invention

A broadband angle resolver comprises two directional couplers and three hybrid junctions. Two ports of each of the directional couplers are coupled, respectively, to two ports of each of two of the hybrid junctions, each coupler being coupled to its hybrid junction through a pair of attenuators which provide voltage transmission coefficients proportional, respectively, to the sine and cosine of an arbitrary angle. The third ports of the first two hybrid junctions are coupled, respectively, to two ports of the third hybrid junction. Alternating signals of the same frequency and having phase angles which are equal but of opposite sign applied to third ports of the two directional couplers will cause a maximum voltage at a third port of the third hybrid junction and a null voltage at its fourth port as the attenuators are adjusted to make the arbitrary angle equal to the phase angles of the signals. The null output can be used to automatically adjust the attenuators while the maximum output is the useful output of the resolver.

Brief description of the drawings

The invention may be better understood by reference to the accompanying drawings, in which:

FIG. 1 discloses the circuits of a preferred embodiment of the invention; and

FIG. 2 discloses a conventional type of attenuator for use in the circuit of FIG. 1.

Detailed description

The circuit shown in FIG. 1 comprises a pair of 3 db directional couplers 10 and 50 each having four ports. Directional coupler 10 has an input port 11 connected to a source of alternating voltage having a frequency $\omega$ with a phase angle $\alpha$. This alternating signal may be one received by a suitable receiving element 1 which may be symmetrically disposed in a planar array with a second receiving element 2; the latter receiving an alternating signal of the same frequency as that received by antenna element 1 and having the same phase angle $\alpha$ but of opposite sign. Receiving element 2 is coupled to input port 51 of directional coupler 50. A second port 12 of coupler 10 is terminated in its characteristic impedance 15 while a second port 52 of coupler 50 is similarly terminated in its characteristic impedance 55. A hybrid junction 40 having four ports 41, 42, 43 and 44, is coupled to ports 13 and 14 of directional coupler 10 through microwave attenuators 20 and 30. Port 13 of the coupler is coupled to port 21 of attenuator 20 while port 22 of the attenuator is coupled to port 41 of the hybrid junction. Similarly port 14 of the coupler is coupled to port 31 of attenuator 30 while port 32 of the attenuator is coupled to port 42 of the hybrid junction. Port 43 of hybrid junction 40 is terminated in its characteristic impedance 45. It is to be understood that if the incoming wave is acoustic, the receiving elements 1 and 2 will be acoustoelectric transducers with or without modulators or frequency translators whereas if this wave is electrical, the elements will be antennas.

Hybrid junction 80 having ports 81, 82, 83 and 84 is coupled to ports 53 and 54 of coupler 50 through attenuators 60 and 70. Port 53 is coupled to port 61 of attenuator 60 while port 62 is coupled to port 81 of hybrid junction 80. Similarly port 54 of the coupler is coupled to port 71 of attenuator 70 while port 72 is coupled to port 82 of hybrid junction 80. Port 83 of the hybrid junction is terminated in its characteristic impedance 85.

A third hybrid junction 90 having ports 91, 92, 93 and 94 has its port 91 coupled to port 44 of hybrid junction 40 and port 92 coupled to port 84 of hybrid junction 80.

Attenuators 20 and 60 are caused to introduce voltage transmission coefficients in their respective paths proportional to the cosine of an arbitrary angle $\theta$ while attenuators 30 and 70 are caused to introduce voltage transmission coefficients in their respective paths proportional to the sine of the same angle. These four attenuators are caused to simultaneously vary their voltage transmission coefficients by means of a common control coupling 6.

It can be shown that the outputs from ports 44 and 84 of hybrid junctions 40 and 80 will be as indicated in FIG. 1 when ports 11 and 51 of the directional couplers 10 and 50 receive alternating signals of the same frequency but with equal and opposite phase angles $\alpha$ and the attenuators are simultaneously controlled to respond to the functions of the arbitrary angle $\theta$. It can also be shown that the outputs from ports 44 and 84, when applied to ports 91 and 92, respectively, or hybrid junction 90, will emerge from ports 93 and 94 over hybrid junction 90 with the voltages shown for these ports in FIG. 1. Since the amplitude of the voltage appearing at port 93 varies with the sine of the difference between the phase angles of the signals and the arbitrary angle of the attenuators, this voltage will reach a null when the arbitrary angle is made equal to the phase angles of the signals. At the same time, the voltage emerging from port 94 of hybrid junction 90 will have an amplitude proportional to the cosine of the difference between these angles. Consequently, the voltage emerging from port 94 will reach a maximum as the voltage at port 93 is approaching zero.

Port 93 is coupled to a feedback means 4 to receive this null voltage. Feedback means 4 may be of conventional construction capable of producing outputs over its output paths 5 and the common control couplings 6 of the attenuators. If the attenuators are controlled electrically, the outputs from feedback means 4 will be electrical. On the other hand, if the attenuators are mechanically controlled output paths 5 and controls 6 are mechanical links to simultaneously control all four attenuators. Feedback means operating either electrically and mechanically are well known in the servo-system art and require no further description. The maximum voltage output from port 94 is applied to the utilization means 3 which may comprise either part of a conventional radar system if the incoming waves are radar beams or part of a voice transmission system if the incoming waves are speech waves.

Attenuators 20, 30, 60 and 70 in FIG. 1 have been shown symbolically, using standard symbols for such devices. If the angle resolution is to remain within the first quadrant, most any microwave attenuator may be used but where the angles are to be varied through all four quadrants the microwave attenuator must be capable of reversing phase. While a perfectly useful device restricted for operation in one quadrant may be made, it is desirable in most modern radar applications, for example, that the attenuator be capable of operating in all four quadrants. An attenuator capable of this property is illustrated in FIG. 2 and is of the type disclosed in Untied States Patent 3,264,586, granted Aug. 2, 1966 to M. Rabinowitz.

FIG. 2 shows only one of the attenuators, for example, attenuator 20 of FIG. 1 which is connected between ports 21 and 22. This attenuator employs a 3 db directional coupler of the same type as couplers 10 and 50 in FIG. 1. In comparing the directional coupler of FIG. 2 with coupler 10, it will be noted that ports 21 and 22 of FIG. 2 correspond with ports 11 and 12, respectively, of FIG. 1, while the ports corresponding to ports 13 and 14 of FIG. 1 are shown in FIG. 2 as ports 104 and 106 terminated by variable resistors 101 and 102 having equal resistances R. These resistors preferably comprise PIN diodes which possess the property of changing their forward resistances as a function of a forward bias current. Terminal 103 is coupled via blocking capacitor 107 to input port 21 and terminal 105 is coupled via blocking capacitor 110 to output port 22. Input port 21 and output port 22 of FIG. 2 are ports 21 and 22, respectively, of FIG. 1. The diodes 101 and 102 are connected between their respective coupler ports 104 and 106 and the ground plane of the coupler represented by the conventional ground symbols 119. The coupler shown is of conventional stripline conestruction; one conductive path comprises arm 114 starting from terminal 103 and terminating in port 106 via arm 117 while the other conductive path comprises arm 115 starting from terminal 105 and terminating in port 104 via arm 116. Coupling region 113 is common to both paths. The two paths are separated by a dielectric layer 118 and it is to be understood that additional dielectric layers, not shown, separate the two conductive paths from a surrounding ground plane, also not shown but symbolically represented by grounds 119. Bias current to the diodes is supplied in a conventional manner from current sources in feedback means 4 of FIG. 1 via output path 5 connected to terminals 109 and 112. Terminals 109 and 112 are conductively connected to terminals 103 and 105 via inductors 108 and 111, respectively.

As is well known, if the resistances R of resistors 101 and 102 are made equal to the characteristic impedance of the coupler, there will be no reflections from their ports 104 and 106 so that energy entering at port 21 will not appear at port 22. As these resistances are caused to differ from the characteristic impedance, the voltage appearing at port 22 will increase in magnitude and will reverse in phase as the resistances R are varied through the characteristic impedance of the coupler. When the resistances R are made zero, the voltage at port 22 will be out of phase with and about equal to the voltage at port 21 and as the resistances are caused to increase toward infinity, the voltage at port 22 will again approach the magnitude of the voltage at port 21 and will be in phase.

It will be evident to those skilled in this art that the invention is not limited to any particular kind of 3 db directional coupler and that most any hybrid junction may be used providing it is capable of operating over the operating frequency band and has the properties described above.

What is claimed is:

1. An angle resolver for resolving the arrival angle of acoustical or electromagnetic waves comprising a first 3 db directional coupler device and a first hybrid junction device, each having four ports, means including first and second attenuators respectively coupling two of the ports of said directional coupler device to two of the ports of said hybrid junction device, a third port of each device being terminated in its characteristic impedance, a second 3 db directional coupler device and a second hybrid junction device each having four ports, means including third and fourth attenuators respectively coupling two of the ports of said second directional coupler device to two of the ports of said second hybrid junction device, a third port of each of said second devices being terminated in its characteristic impedance, means for applying alternating signals to the fourth ports of said first and second directional couplers, the signals being of the same frequency and having phase angles which are equal but of opposite sign, a third hybrid junction device having four ports, two of said ports being coupled respectively to the fourth ports of said first and second hybrid junction devices, and means coupling all four of said attenuators for simultaneous operation, said attenuators being so constructed that two of them provide a voltage transmission coefficient proportional to the cosine of an arbitrary angle while the remaining two attenuators provide a voltage transmission coefficient proportional to the sine of the same arbitrary angle, whereby the voltages appearing at the third and fourth ports of said third hybrid junction will reach a maximum and a null, respectively, as said attenuators are adjusted so that said arbitrary angle equals the phase angles of the signals applied to the fourth ports of said directional couplers.

2. The combination of claim 1 and a feedback means coupling the fourth port of said third hybrid junction to said attenuators to automatically adjust said attenuators until the output at the fourth port of said third hybrid junction reaches a null.

3. A broadband angle resolver for resolving the arrival angle of acoustical or electromagnetic waves comprising two 3 db directional couplers and three hybrid junctions, said couplers and junctions each having four ports, two transmission paths respectively coupling two of the ports of one of said directional couplers to two of the ports of the first one of said hybrid junctions, an attenuator in each of said transmission paths constructed to provide voltage transmission coefficients in said paths proportional, respectively, to the cosine and the sine of an arbitrary angle, two additional transmission paths respectively coupling two of the ports of the other directional coupler to two of the ports of a second one of said hybrid junctions, an attenuator in each of said additional transmission paths constructed to provide voltage transmission coefficients in said additional paths proportional, respectively, to the cosine and sine of said arbitrary angle, means terminating a third port of each directional coupler and each of said first and second hybrid junctions with their characteristic impedances, means applying alternating voltage signals to the fourth ports of each of said directional couplers, said signals being of the same frequency and having phase angles which are equal but are of opposite sign, and means coupling two of the ports of said third hybrid junction to the fourth ports, respectively, of said first and second hybrid junctions, whereby said third hybrid junction will have a voltage approaching a maximum value at a third port and a voltage approaching a null at its fourth port as said attenuators are simultaneously adjusted so that said arbitrary angle approaches the phase angles of said alternating voltage signals.

4. The combination of claim 3 and a feedback means coupling the fourth port of said third hybrid junction to said attenuators to automatically adjust said attenuators until the output at the fourth port of said third hybrid junction reaches a null.

References Cited

UNITED STATES PATENTS 3,176,297   3/1965   Forsberg _____ 343—854 X

HERMAN KARL SAALBACH, Primary Examiner

PAUL L. GENSLER, Assistant Examiner

U.S. Cl. X.R.

328—155; 333—10, 81; 343—854